US011403086B2

(12) United States Patent
Philippov et al.

(10) Patent No.: US 11,403,086 B2
(45) Date of Patent: Aug. 2, 2022

(54) SYSTEM AND METHOD FOR UPGRADING OPERATING SYSTEM OF A CONTAINER USING AN AUXILIARY HOST

(71) Applicant: Virtuozzo International GmbH, Schaffhausen (CH)

(72) Inventors: Mikhail Philippov, Moscow (RU); Alexey Kostyushko, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 921 days.

(21) Appl. No.: 15/337,039

(22) Filed: Oct. 28, 2016

(65) Prior Publication Data
US 2018/0121189 A1 May 3, 2018

(51) Int. Cl.
*G06F 8/65* (2018.01)
*G06F 9/455* (2018.01)

(52) U.S. Cl.
CPC .............. *G06F 8/65* (2013.01); *G06F 9/455* (2013.01)

(58) Field of Classification Search
CPC .. G06F 8/65–72; G06F 21/57; G06F 8/60–71; G06F 8/76
USPC ........................................................ 717/168
See application file for complete search history.

(56) References Cited

U.S. PATENT DOCUMENTS

| | | | | |
|---|---|---|---|---|
| 8,219,653 B1* | 7/2012 | Keagy | ....................... | G06F 8/63 709/222 |
| 2004/0015941 A1* | 1/2004 | Sekine | ..................... | G06F 8/65 717/168 |
| 2010/0192143 A1* | 7/2010 | Ingle | ........................ | G06F 8/63 717/172 |
| 2010/0235828 A1* | 9/2010 | Nishimura | ................ | G06F 8/63 717/174 |
| 2011/0107300 A1* | 5/2011 | Vidal | ........................ | G06F 8/65 717/121 |
| 2012/0005676 A1* | 1/2012 | Nakajima | ................. | G06F 8/65 718/1 |
| 2013/0047160 A1* | 2/2013 | Conover | ................... | G06F 8/65 718/1 |

(Continued)

OTHER PUBLICATIONS

Parallels Containers for Windows 6.0 User's Guide May 26, 2014 (Year: 2014).*

(Continued)

*Primary Examiner* — Emerson C Puente
*Assistant Examiner* — Paul V Mills
(74) *Attorney, Agent, or Firm* — ArentFox Schiff LLP; Michael Fainberg

(57) ABSTRACT

Disclosed are methods and systems for upgrading a container to another version of an operating system while preserving user applications and data of the container. In a general aspect, the method comprises: copying, from a first container host to an auxiliary host, an operating system kernel of the first container host, and system files and user applications and data of the container; upgrading on the auxiliary host the operating system, including the kernel of the operating system and system files of the container, from one version of the operating system to another version of the operating system, while preserving user applications and data; and copying, from the auxiliary host to a second container host, the system files of the upgraded operating system, and the preserved user applications and data.

29 Claims, 9 Drawing Sheets

(56) References Cited

U.S. PATENT DOCUMENTS

| | | | | |
|---|---|---|---|---|
| 2014/0337825 | A1* | 11/2014 | Challa | G06F 8/60 |
| | | | | 717/168 |
| 2015/0142878 | A1* | 5/2015 | Hebert | G06F 9/4843 |
| | | | | 709/203 |
| 2015/0319222 | A1* | 11/2015 | Zamir | H04L 67/10 |
| | | | | 709/217 |
| 2016/0092343 | A1* | 3/2016 | Chhatwal | G06F 11/3664 |
| | | | | 717/124 |
| 2016/0132420 | A1* | 5/2016 | Kuo | G06F 9/45558 |
| | | | | 717/130 |
| 2016/0170735 | A1* | 6/2016 | Kuo | G06F 8/65 |
| | | | | 717/169 |
| 2016/0266917 | A1* | 9/2016 | Emelyanov | G06F 9/455 |
| 2017/0090897 | A1* | 3/2017 | Veereshwara | G06F 8/65 |
| 2017/0090903 | A1* | 3/2017 | Bainville | G06F 8/71 |
| 2017/0180346 | A1* | 6/2017 | Suarez | G06F 8/71 |
| 2017/0300311 | A1* | 10/2017 | Vasquez Lopez | G06F 8/63 |
| 2017/0322824 | A1* | 11/2017 | Reuther | G06F 3/0604 |
| 2018/0011699 | A1* | 1/2018 | Manthiramoorthy | G06F 8/65 |
| 2018/0052675 | A1* | 2/2018 | Ghosh | G06F 8/65 |
| 2018/0088926 | A1* | 3/2018 | Abrams | H04L 67/34 |
| 2018/0088963 | A1* | 3/2018 | Arora | G06F 8/65 |

OTHER PUBLICATIONS

Parallels Virtual Automation 6.1 Administrator's Guide Apr. 8, 2014 (Year: 2014).*

Parallels Virtuozzo Containers 4.7 for Linux User's Guide (Year: 2012).*

Parallels Agent Programmer's Guide pp. 11, 12, 16, 17, 113, 127-129 (Year: 2008).*

Windows container version compatibility Microsoft https://docs.microsoft.com/en-us/virtualization/windowscontainers/deploy-containers/version-compatibility (Year: 2020).*

Is Windows 10 really the last version of Windows? Brien Posey https://searchenterprisedesktop.techtarget.com/answer/Is-Windows-10-really-the-last-version-of-Windows?vgnextfmt=print (Year: 2015).*

Which Version of Version? Phil Haack https://haacked.com/archive/2006/09/27/Which_Version_of_Version.aspx/ (Year: 2006).*

Deploying Windows 10—Automating deployment by using System Center Configuration Manager Andre Della Monica, Alessandro Cesarini, Russ Rimmerman, Victor Silveira Feb. 16, 2016, ISBN: 978-1-5093-0186-7 (Year: 2016).*

On the Challenges and Solutions for Migrating Legacy Distributed Applications into Cloud Chunqiang Tang, Byung Chui Tak, Long Wang, Hai Huang, and Salman Baset (Year: 2014).*

* cited by examiner

SYSTEM AND METHOD FOR UPGRADING OPERATING SYSTEM OF A CONTAINER USING AN AUXILIARY HOST

TECHNICAL FIELD

The disclosure is generally directed to the field of operating system level virtualization (also called container virtualization), and in particular, to systems and methods for upgrading operating system of a container to another version of an operating system using an auxiliary host while preserving user applications and data of the container.

BACKGROUND

In computing, virtualization refers to the act of creating a virtual (rather than physical) version of a hardware resource, e.g., virtual computer platforms, operating systems, storage devices, and computer network resources. In recent years, virtualization has become a popular means for allowing multiple operating systems to coexist on the same physical hardware.

Historically, virtualization in this context has followed a hypervisor-based paradigm. A hypervisor (also known as virtual machine monitor, "VMM") sits in between the guest operating system and the underlying physical hardware. The hypervisor software typically resides as part of a base operating system (e.g. "hosted virtualization"). However, "bare metal" implementations are possible, wherein the necessary hardware device drivers are part of the hypervisor and only one memory and CPU manager is needed. In either case, the hypervisor controls the resource allocation to the one or more guest operating systems running on top of the physical hardware. The basic principle behind hypervisor-based virtualization is that the underlying physical hardware may be emulated in order to create virtual hardware resources (e.g., one or more virtual processors and memory) and that guest operating systems may then be installed on top of the hardware emulation layer. As a result, this type of virtualization is normally operating system agnostic, i.e., a base operating system (e.g., Windows) can have one or more different guest operating systems (e.g., one or more Linux distributions) running on it as separate virtual machines.

More recently, containers (a kind of virtual environments; also known as virtual private servers) have emerged as an increasingly popular alternative for implementing virtualization of multiple operating systems on a single physical machine. In contrast to hypervisor-based virtualization, container-based virtualization occurs at the operating system level, rather than the hardware level (i.e., the "guest" operating system environment of each container shares the same kernel as the operating system running on the base system). Given that each container shares most of the base operating system, containers tend to be smaller and more lightweight compared to virtual machines implemented by a hypervisor.

When implemented properly, virtualization allows for isolation of virtual environments, resource isolation, and better utilization of hardware resources. However, current virtualization methods suffer from notable limitations that reduce their usefulness. For example, operating system level virtualization requires that the base operating system running on a container host have a kernel that is compatible with the guest operating system of each container (e.g., the base operating system must be able to provide system calls for applications running in containers). In practice, this typically requires that the same kernel be used by the base operating system and all the container operating systems, substantially reducing the ability of administrators to upgrade guest operating systems.

As such, there exists a clear need in the art for improved methods, systems, and computer program products that would allow system administrators to upgrade operating systems implemented as containers on a container host (e.g., a physical or virtual machine).

SUMMARY

The present disclosure provides improved methods and systems for upgrading a container to another version of an operating system while preserving user applications and data of the container. In some aspects, the disclosed systems and methods reduce or eliminate the above-identified problems in the art. In addition, various aspects of the disclosure provide additional benefits and solutions as discussed in detail below and which will be readily apparent in light of the disclosure. In one exemplary aspect, the disclosure provides a method for upgrading a container to another version of an operating system while preserving user applications and data of the container, the method comprising: copying, from a first container host to an auxiliary host, an operating system kernel of the first container host, and system files and user applications and data of the container; upgrading on the auxiliary host the operating system, including the kernel of the operating system and system files of the container, from one version of the operating system to another version of the operating system, while preserving user applications and data; and copying, from the auxiliary host to a second container host, the system files of the upgraded operating system, and the preserved user applications and data.

In some aspects, at least one of the first container host or the second container host is a physical machine comprising at least one processor.

In some aspects, each of the first and second container hosts is configured to run at least one container on a shared kernel.

In some aspects, along with copying, from the first container host to the auxiliary host, the method further comprises: configuring the kernel of operating system and the system files of the container to boot the operating system generated by combining them on the auxiliary host.

In some aspects, along with copying, from the auxiliary host to the second container host, the method further comprises: configuring the upgraded system files of the container to run the container on the second container host.

In some aspects, upgrading the operating system on the auxiliary host further comprises coherently upgrading the kernel of the operating system and the system files of the container to a newer version of the operating system, while preserving user applications and data.

In some aspects, upgrading the operating system on the auxiliary host further comprises: booting the operating system on the auxiliary host.

In some aspects, the upgrade is performed using one or more tools provided by an operating system vendor.

In some aspects, the upgrade is performed in-place on a running operating system.

In some aspects, the upgrade is performed on the stopped auxiliary host.

In some aspects, the auxiliary host is a physical machine.

In some aspects, the auxiliary host is a virtual machine.

In some aspects, the auxiliary host is selected according to the configuration of the resources that the container had on the first container host.

In some aspects, the auxiliary host comprises a virtual machine created according to the configuration of the resources that the container had on the first container host.

In some aspects, the first and second container hosts provide OS level virtualization and the auxiliary host does not provide OS level virtualization.

In some aspects, the method further comprises: providing a control agent configured to control the one or more steps of the method.

In some aspects, the functionality of the control agent may be distributed among one or more of the first container host, the second container host and the auxiliary host.

In a second exemplary aspect, the disclosure provides a system for upgrading a container to another version of an operating system while preserving user applications and data of the container, the system comprising: at least one processor executing a control agent configured to control: copying, from a first container host to an auxiliary host, an operating system kernel of the first container host, and system files and user applications and data of the container; upgrading on the auxiliary host the operating system, including the operating system kernel and system files of the container, from one version of the operating system to another version of the operating system, while preserving user applications and data; and copying, from the auxiliary host to a second container host, the system files of the upgraded operating system, and the preserved user applications and data.

In a third exemplary aspect, the disclosure provides a system for upgrading a container to another version of an operating system while preserving user applications and data of the container, the system comprising: a first container host comprising a kernel of a first version of the operating system and configured to run at least one container, the container comprising system files and user applications and data; a second container host comprising a kernel of a second version of the operating system; an auxiliary host communicatively coupled to the first and second container hosts; wherein: the operating system kernel and system files, user applications and data of the container are copied from the first container host to the auxiliary host; the operating system on the auxiliary host, including the operating system kernel and system files of the container, is upgraded from one version of the operating system to another version of the operating system, while preserving user applications and data; and the system files of the upgraded operating system, and the preserved user applications and data are copied from the auxiliary host to the second container host.

In a fourth exemplary aspect, the disclosure provides a non-transitory computer readable medium storing computer executable instructions for upgrading a container to a newer version of an operating system while preserving user applications and data of the container, including instructions for: copying, from a first container host to an auxiliary host, an operating system kernel of the first container host, system files and user applications and data of the container; upgrading on the auxiliary host the operating system, including the operating system kernel and system files of the container, from one version of the operating system to another version of the operating system, while preserving user applications and data; and copying, from the auxiliary host to a second container host, the system files of the upgraded operating system, and the preserved user applications and data.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

DETAILED DESCRIPTION

Exemplary aspects of the disclosure are described herein in the context of a system, method and computer program product for upgrading a container to another version of an operating system while preserving user applications and data of the container. Those of ordinary skill in the art will realize that the following description is illustrative only and is not intended to be in any way limiting. Other aspects will readily suggest themselves to those skilled in the art having the benefit of this disclosure. Reference will now be made in detail to implementations of exemplary aspects as illustrated in the accompanying, drawings. The same reference indicators will be used to the extent possible throughout the drawings and the following description to refer to the same or like items.

As noted above, operating system level virtualization allows one to virtualize physical servers on the operating system (kernel) layer. The operating system virtualization layer ensures isolation and security of resources between different containers. The virtualization layer makes each container appear as a standalone server. Finally, the container itself houses its own applications and workload. Operating-system-level virtualization normally imposes little to no overhead, because programs in containers use the operating system's normal system call interface and so do not require any kind of emulation and do not need to be run in a virtual machine, as is the case with hypervisor-based virtual machines. Operating system virtualization is streamlined for improved performance, management, and efficiency compared to alternative methods of virtualization such as hypervisor-based virtual machines. Despite these benefits, operating-system-level virtualization is non-ideal for many applications because of its lack of flexibility. For example, the operating system of container must be compatible with the kernel of the base operating system (in other words, the kernel must provide all the system calls that applications in the container require). This latter issue presents a substantial roadblock for system administrations that wish to upgrade the operating system of a container, because it can lead to the kernel upgrade and eventually break the container functionality. As a result, many users continue to opt for hypervisor-based virtualization instead of operating system level virtualization, despite the performance penalty, in order to easily upgrade guest operating systems running as virtualized environments.

Figure 1:
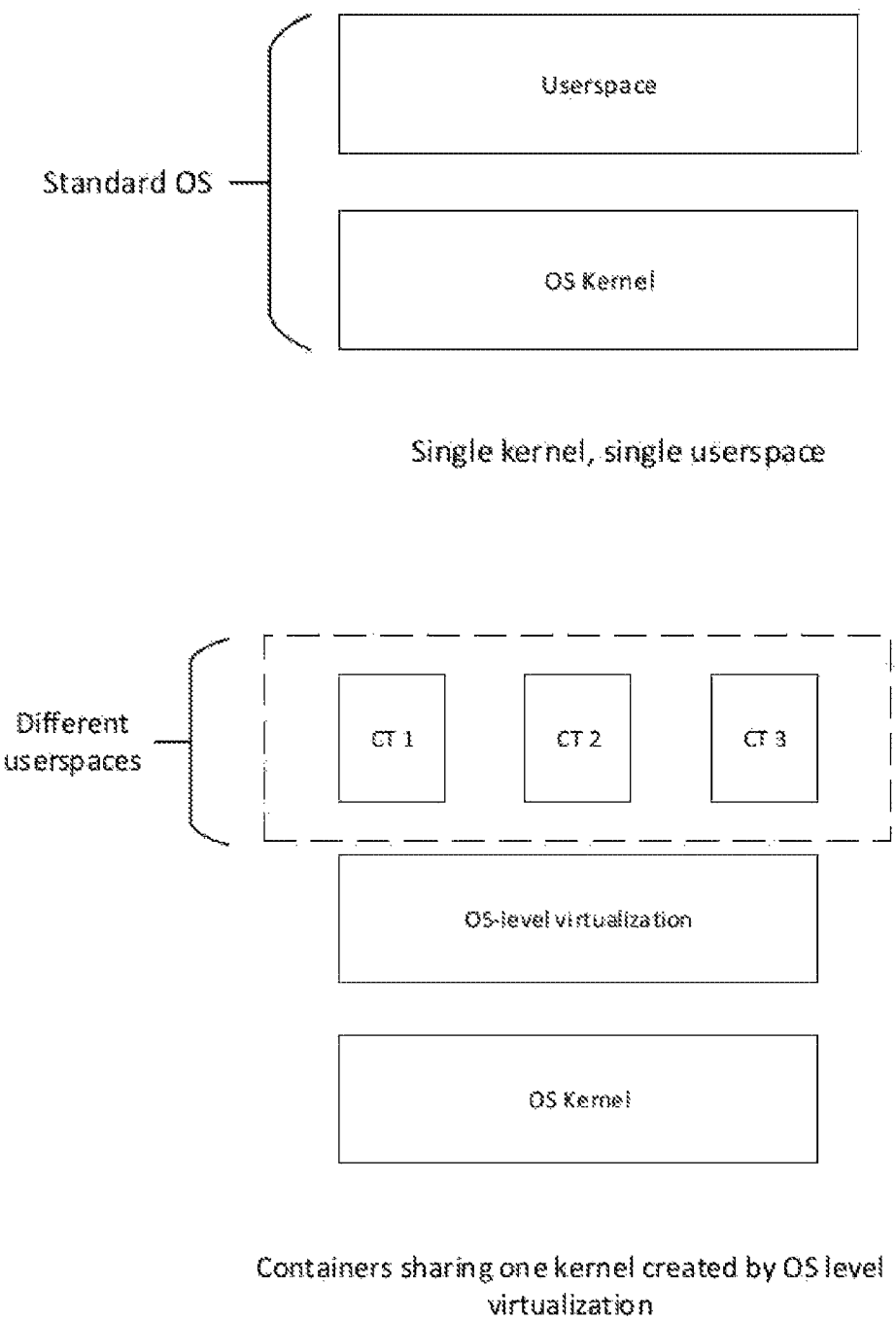
FIG. 1 is a block diagram illustrating a standard operating system and an operating system having multiple containers created by operating system level virtualization

FIG. 1 illustrates a schematic diagram of a standard operating system and an operating system having multiple containers created by operating system level virtualization. As shown by these figures, a modern operating system (OS) usually segregates virtual memory into kernel space and user space. A standard operating system has a single kernel working in the privileged mode (i.e. Ring 0), which is responsible for basic computer functionality (e.g., creating and scheduling processes and threads, processing simple input/output operations, and handling interrupts); and one user space (which should not be confused with user address space which is different for each process) which contains all the applications and etc., that are functioning in the deprivileged mode (Ring 3). Thus, as shown by FIG. 1, a standard OS has a single kernel and a single user space.

In contrast to the above, a system configured to implement operating system level virtualization is capable of separating kernel space and user space such that individual containers may be generated, which are fully independent from each other. User applications can run inside of the containers. As such, the single user space of the traditional configuration has in essence been separated into multiple user spaces. Separating user applications between separate containers provides several possible advantages, including improved security, hardware independence, and added resource management features. Furthermore, as noted above, operating system level virtualization usually imposes little to no overhead, because programs in containers use the operating system's normal system call interface and so do not need to be subjected to emulation or be run in a virtual machine. This reliance on the base operating system kernel for system calls reduces overhead. However, it also imposes limitations on the potential operating systems that may be selected for the containers on one host. For example, a host machine running Windows Server 2012 as the base operating system cannot support containers running Windows Server 2016. The similar issues occur in Linux and Unix-based operating systems.

Figure 2:
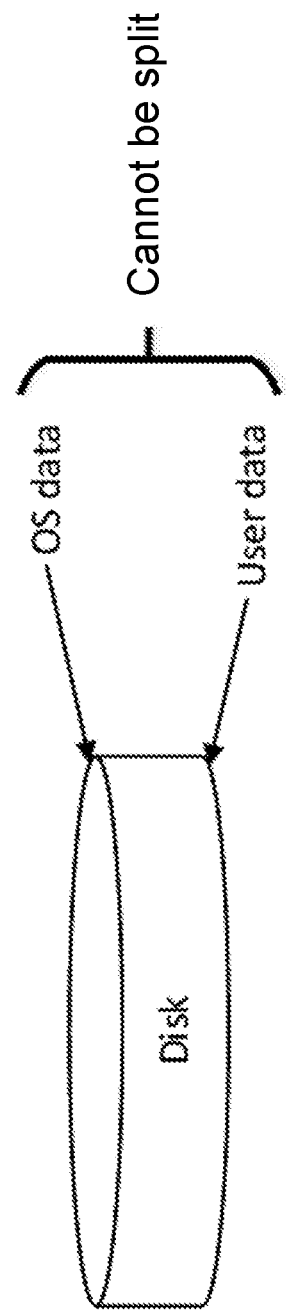
FIG. 2 is a block diagram illustrating a disk volume, showing that user data and operating system data are typically stored together are generally inseparable.

In addition, the compatibility issue limits system administrators' ability to upgrade containers. For example, in a multi-container configuration such as that illustrated in FIG. 1, if one were to initiate a Windows upgrade of any of the containers on the host, all other containers would not be able to function because the upgrade would have rendered the operating system kernel incompatible with the non-upgraded containers. To recover data and restore functionality, one would need to split the system files and user data inside each of the non-functioning containers and then upgrade the system files. This process is cumbersome and may be unsuccessful, because modern operating systems are self-contained and, as shown by FIG. 2, system files and user data are typically located together on the same disk and cannot be easily separated. Consequently, it would be difficult for a manual or automated effort to distinguish the user data from the system data and to identify which portions of the disk contain system data that should be upgraded in order to restore functionality. Moreover, an attempt to upgrade an operating system that has multiple containers can break the means of virtualization and structure of containers.

These limitations may be overcome, providing methods which allow system administrators to efficiently upgrade containers on a container host to another version of OS. A container host is a machine (physical or virtual), capable of running containers. In some aspects, the first container host runs multiple containers which share the OS kernel, so that only one running instance of the OS kernel is needed for execution of several containers. The upgrade processes described herein may be initiated, controlled or otherwise implemented by a control agent residing on the first or second container hosts, the auxiliary host, or distributed among any of these three systems. In some aspects, it may include the container engine (container engine is a runtime environment implementing OS level virtualization) of one or both container hosts. In further aspects, it may send commands to other components of the system, launch the upgrade mechanism, initiate and control copying, change configuration files, or perform any other steps or algorithms necessary to complete the upgrade processes disclosed herein.

Figure 3:
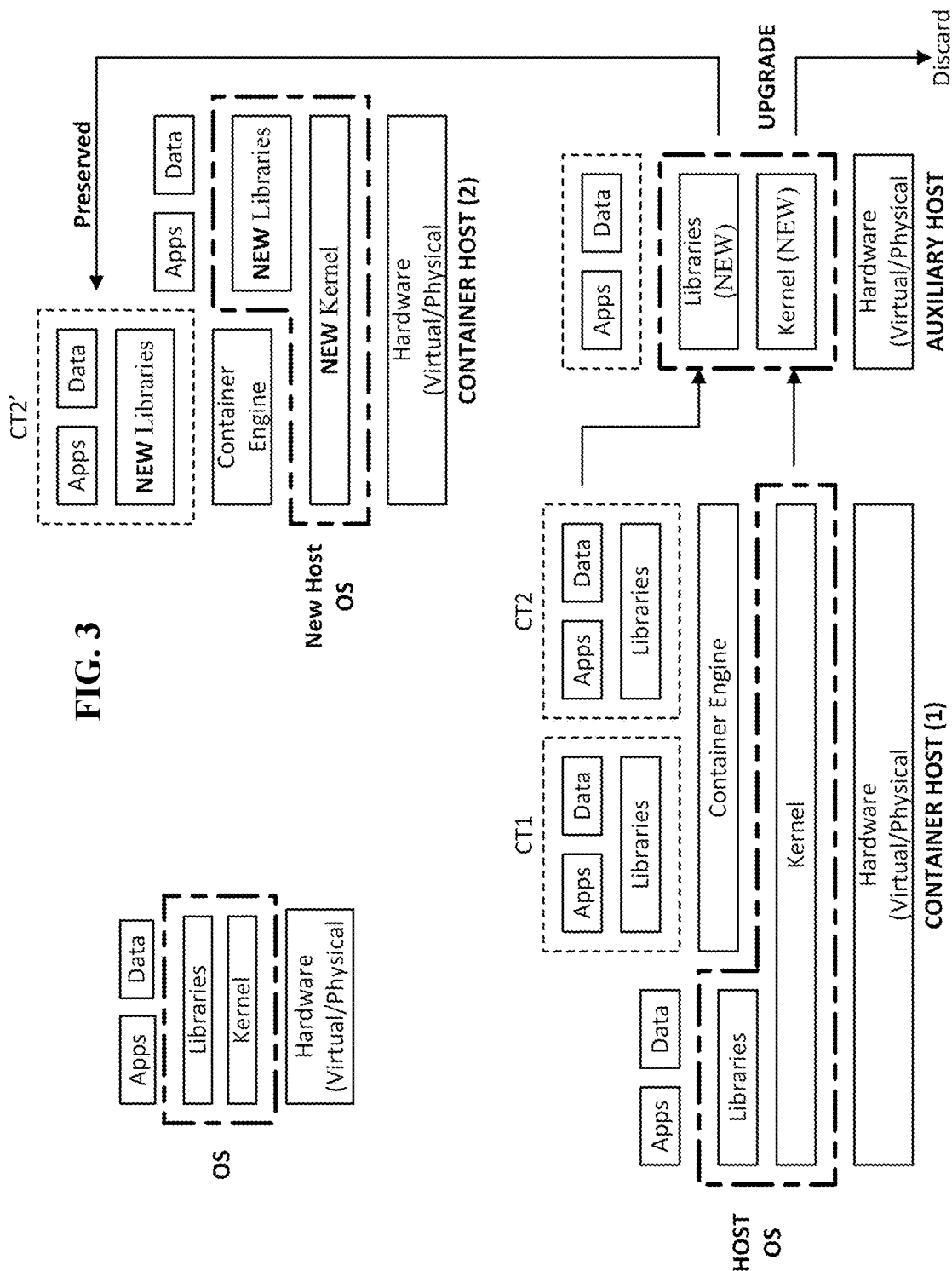
FIG. 3 is a block diagram illustrating a method and system for upgrading a container to another version of an operating system while preserving user applications and data of the container, according to an exemplary aspect of the disclosure.

FIG. 3 is a block diagram illustrating a method and system for upgrading a container to another version of an operating system while preserving user applications and data of the container. In this diagram, an operating system in a container CT2 on a first container host is upgraded to container CT2' on a second container host via an auxiliary host provided specifically for the purpose of upgrading container OS. In order to better understand the basis for the disclosed methods, the following passages explain the logic and organization behind operating system level virtualization and illustrate a general process for upgrading an operating system of container according to the disclosed methods. This general implementations will be further elaborated upon further in FIGS. 4-7, which describe alternative methods similar to this exemplary aspect.

The logical structure of files and directories stored in a container is typically identical to the logical structure of files and directories of the OS. The logical structure of files and directories of the container can be located in the file system, which is typically located in a persistent storage that provides the interface of a block device. This interface allows one to read and write to it using blocks of similar length. The block device is partitioned and can be configured to boot the OS. (e.g., by marking the partition "active" and booting the OS.) The persistent storage is typically contained in a file on the container host and is called the disk of the container.

The disk of the container contains user data, user applications and system files that are specific for the container. In some aspects, it also contains a copy of the kernel of the OS and copies of those system files that exist in the OS but are not needed in the container (i.e., they are not executed). In such aspects, the disk of the container already contains files that are needed to run the OS. Therefore, it is possible to copy the disk of the container from the first container host to an auxiliary host (e.g., as in the presently disclosed methods). In other exemplary aspects, the disk of the container can contain links to these files, which are located (as only one instance) on any other disk on the host. In such exemplary aspects, before copying, additional steps must be conducted. The disk of the container cannot be copied as-is in these instances, because it does not contain the OS kernel, some system files (that are shared between containers) and some drivers. The drivers are boot time drivers or those that perform (i.e. work) with the hardware, like drivers of file system or for network adapter. Once these additional steps are complete, the container disk should contain the OS kernel, the system files, and all its own user applications and data.

At this stage, the auxiliary host (e.g., a virtual or physical machine) may then be prepared according to the parameters of the container being upgraded. It is important that the OS generated using the copied container files and the OS kernel of the first container host can boot on the auxiliary host. To achieve this, the parameters of the auxiliary host should be compatible with the parameters of the container. In some implementations, the container configuration file contains information about how much disk space, RAM and how many CPUs and network adapters the container needs. If a physical machine is selected to be the auxiliary host, this information may be used to select compatible hardware. Alternatively, in aspects where a virtual machine is selected to be the auxiliary host, the next steps will typically be analyzing the container configuration file and creating a virtual machine with the same hardware capabilities as the container had on the first container host. Alternatively, the auxiliary host may be selected from a set of suitable virtual machines prepared in advance.

In some aspects, partitioning may be required as an additional step at this stage (e.g., if the auxiliary host is a virtual machine, disk partitioning may be necessary). In these instances, at least one partition and a partition table is created.

In some aspects, conversion of the data being copied may also be necessary. In these instances, the copied data (e.g., copied from the first container host to the auxiliary host) may be converted according to a destination disk layout (e.g., file system), preserving the logical structure of the copied files and directories.

The next stage in the method will be the copying of data from the first container host to the auxiliary host. During this process the container disk (e.g., a block device) is typically copied block-by-block from the first container host to the auxiliary host. In some aspects, all used blocks of the first container host disk are copied. The copying may be performed not only at the block level but also at the file level, etc. Typically, copying is conducted in a manner that preserves the logical structure of files and directories of the container.

After the copying step, the partition of the auxiliary host (e.g., the selected virtual machine disk) containing the OS kernel is typically marked as "active," indicating that the system can boot from it.

At this point, the auxiliary host contains the OS, which has the OS kernel and hardware drivers from the first container host and all of the container files (e.g., user applications and data). For example, if a virtual machine is used as the auxiliary host, at this stage the OS files would typically be stored on a bootable partition of the virtual machine disk, where the virtual machine has all the necessary hardware. To boot (launch) the OS, the boot configuration may be changed if necessary so that necessary hardware drivers (e.g., drivers of the file system, network, etc.) are launched at boot time. Typically, OS software drivers, which reflect the hardware configuration, are configured so that the OS can work with virtual devices of a virtual machine.

With these steps in place, the auxiliary host containing the OS may then be booted. Once the auxiliary host is booted, its OS, including the kernel of the OS and system files of the container, may be upgraded from one version of the OS to another version of the OS using standard techniques, for example, using OS upgrade files provided by the OS vendor. Notably, the upgrade of the OS does not affect the user applications and data of the container, which remain preserved and unchanged during the upgrade. In some aspects, the OS upgrade can be performed on a stopped machine (i.e., without booting the OS). In others, when the OS is booted on the auxiliary host, it can be upgraded in place using OS vendor-supplied tools. In one exemplary aspect, the OS kernel and the container system files are upgraded coherently, such that any changes to one component are followed by appropriate or otherwise compatible changes to the other, ensuring that the OS will still work consistently post-upgrade.

After the upgrade is complete, the disk of container (i.e. block device) may be copied block-by-block from the auxiliary host to the second container host, which runs an upgraded version of the OS. All used blocks of the container disk are typically copied. As noted above in the discussion of the previous copying step, the copying can be performed not only at the block level but also at the file level, etc. Copying is typically conducted in a manner that preserves the logical structure of files and directories of the container.

The OS kernel and all system files and hardware drivers that were added to the disk of container during the initial step of the process (e.g., prior to copying from the first container host to the auxiliary host) may be maintained on the disk after copying from the auxiliary host to the second container host. In some aspects, they may be replaced by links to the corresponding files on the second container host.

At this stage, the upgraded OS and system files may be further configured. Hardware drivers that were marked as boot time drivers during the process may be removed, or replaced with links to corresponding files, or deactivated.

At this stage, in many aspects a container engine will typically mount the file system from the copied disk, load the OS configuration files (e.g., a mount registry from disk based file) and create the isolation between the upgraded container and all other containers working on the second container host. The container engine is the component of the system which performs the OS-level virtualization and managers the containers on said system. In some aspects, the container engine may allocate resources for the container according to the container configuration file from the first container host. In some aspects, the container engine may then launch the container initiation process (e.g., "ssms" in the case of a Windows OS).

Figure 4:
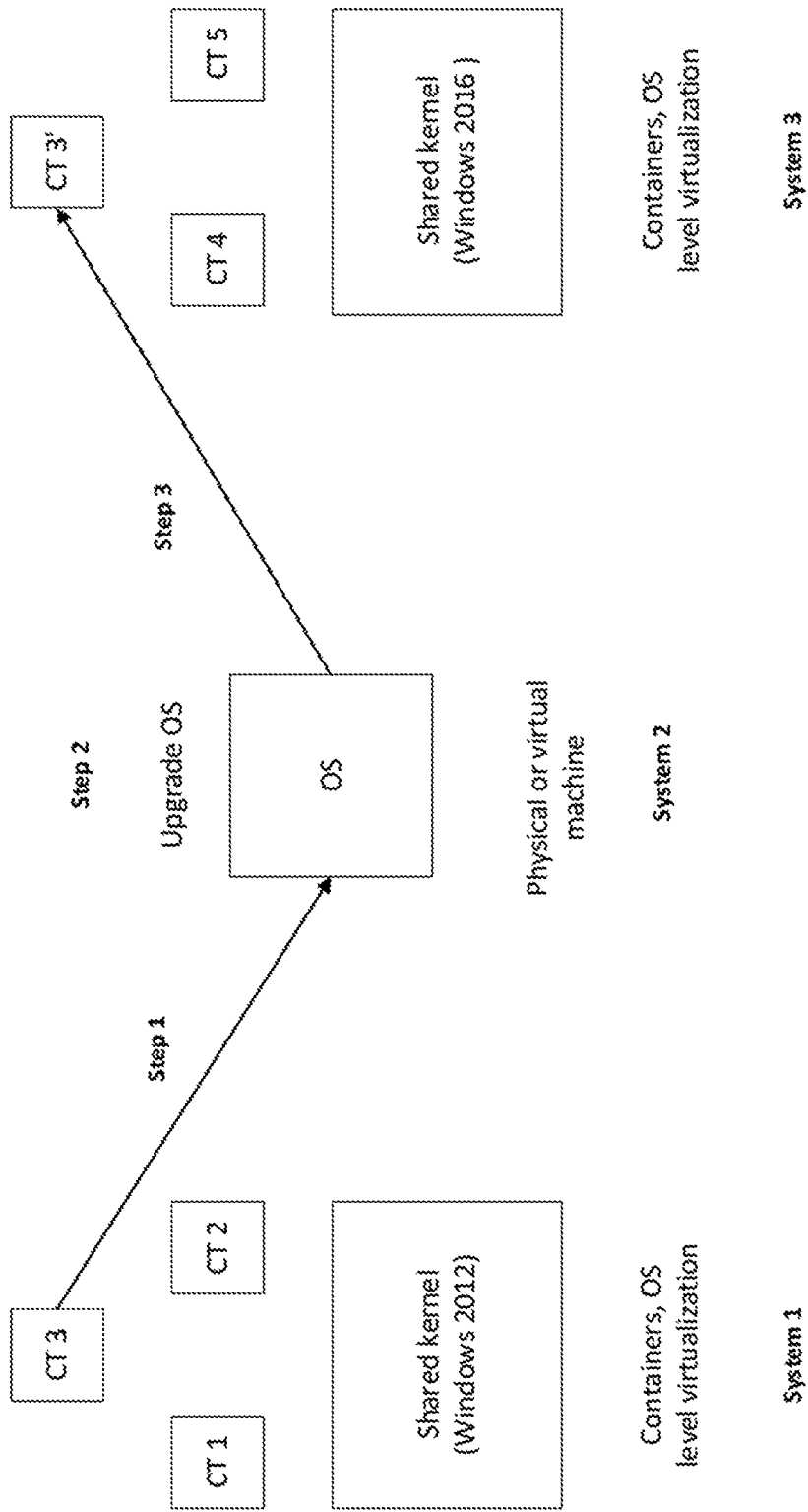
FIG. 4 is a block diagram illustrating another method and system for upgrading a container to another version of an operating system while preserving user applications and data of the container, according to a further exemplary aspect of the disclosure.

FIG. 4 is a block diagram of a method and system for upgrading a container to another version of an operating system while preserving user applications and data of the container, according to an exemplary aspect of the disclosure. In particular, this figure illustrates a process of upgrading a container running Windows Server 2012 to Windows Server 2016. In this example, the first container host (System 1, which may be either physical or virtual machine) supports OS level virtualization and runs several containers (e.g., CT1, CT2, and CT3) on Windows Server 2012 OS. As noted above, all containers are sharing the kernel of Windows Server 2012 OS. For example, container CT3 has to be upgraded to Windows Server 2016 OS. However, upgrade of OS of container CT3 cannot be done on the first container host without effecting containers CT1 and CT2. Therefore, it is desirable to upgrade the OS of the container CT3 and move it to another container host (e.g., System 3, which may be either physical or virtual machine that runs Windows Server 2016). In one exemplary aspect, this OS upgrade can be facilitate via an auxiliary host (System 2), which may be a physical or virtual machine and which may not necessarily support OS level visualization. In one aspect, the auxiliary host may contain only physical or virtual hardware and no software at all. The kernel of the Windows Server 2012 OS of the first container host and system files and user applications and data of the container CT3 may be copied from the first container host to this auxiliary host. In one aspect, the original container CT3 may be destroyed on the first container host to release system memory and disk space for other purposes. (So it can be said that the container was migrated to the auxiliary host.) Then, the auxiliary host may be booted and the kernel of the Windows Server 2012 and copied system files, may be upgraded to Windows Server 2016. An upgrade is possible at this stage because the kernel of CT3 is no longer shared with the original host machine or other containers. Notably, all copied user applications and data of the container CT3 will remain preserved and unchanged on the auxiliary host. Once the OS upgrade is complete, the upgraded OS system files and the preserved user applications and data may be copied from the auxiliary host into a container CT3' on a second container host (System 3), which runs Windows Server 2016 and supports OS level virtualization. This method ensures that all user applications and data of the container CT3 is preserved during upgrade of the OS of the container CT3 from one version of the OS to another version of the OS.

In various aspects of this exemplary aspect, any of the hosts used during the process (e.g., the first container host, the second container host, or the auxiliary host) are independently selected from either a physical or virtual machine. In alternative aspects, the operating system running on any of these hosts is a version of Windows (e.g., home or server), or a distribution of Linux or Unix. In still further aspects, at least one of the hosts has multiple containers. In still further aspects, the upgrading of the guest operating system of the container uses the native upgrade process for the operating system, whereas in others a third party software may be used to perform the upgrade.

In various aspects, the upgrade may be performed automatically by software (e.g., control agent) without user intervention. In some aspects, the upgrade may be performed automatically by the control agent with some user control, such as the selection of at least one of a container to be upgraded and/or a destination host. In one exemplary aspect, the control agent may be implemented as standalone software running on a separate machine or any of the hosts involved in the upgrade process. In other aspects, the functionality of the control agent may instead be distributed among one or more of the first container host, the second container host and the auxiliary host (e.g., the control agent may be implemented as separate components or modules running on these hosts which each control or perform a subset of the upgrade steps).

Figure 5:
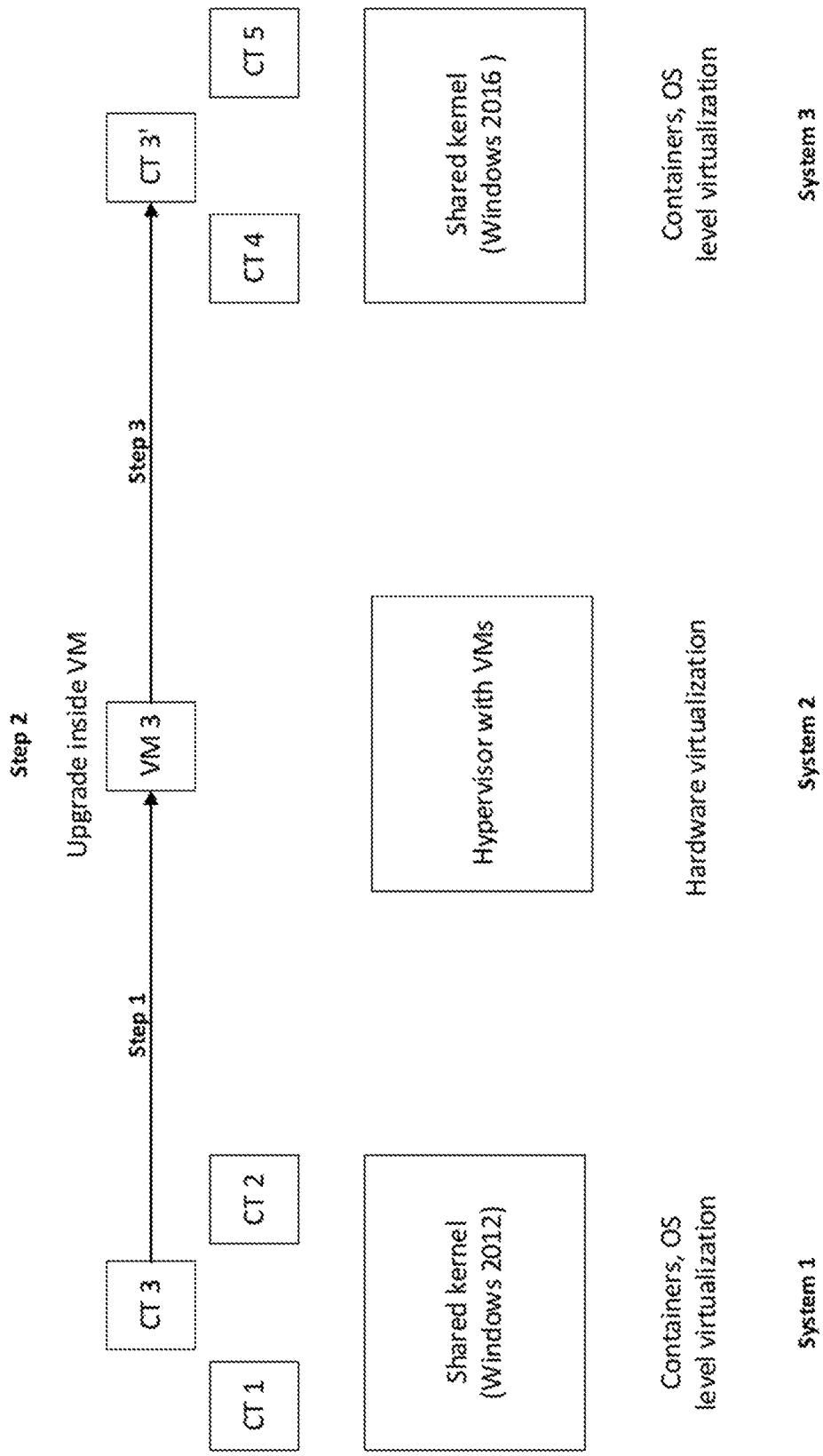
FIG. 5 is a block diagram illustrating another method and system for upgrading a container to another version of an operating system while preserving user applications and data of the container, according to a further exemplary aspect of the disclosure.

FIG. 5 is a block diagram illustrating a further exemplary aspect of the methods and systems of the present disclosure. As noted in the previous example, any of the hosts involved in the upgrade process may be a physical or virtual machine. In this exemplary aspect, the auxiliary host ("System 2") has a hypervisor, which supports hardware virtualization. This method follows the general process of the previous example. However, in this aspect CT3 is migrated/converted to a virtual machine ("VM3") during the initial step of transferring the container to System 2. Inside the virtual machine of the auxiliary host (System 2), VM3 is upgraded. This is possible because the hypervisor provides all of the hardware (either by virtualizing or by passing through) to the guest operating system, and so the guest operating system operates as if it was running on a physical server. Thereafter, the upgraded operating system of VM3 is migrated/converted to the second container host ("System 3") as a new container ("CT3'"). At this stage, the upgraded operating system of CT3' is compatible with the kernel of the operating system running on System 3. As above, this method ensures the safety of any user data inside the container and compatibility of the container with the new kernel.

Figure 6:
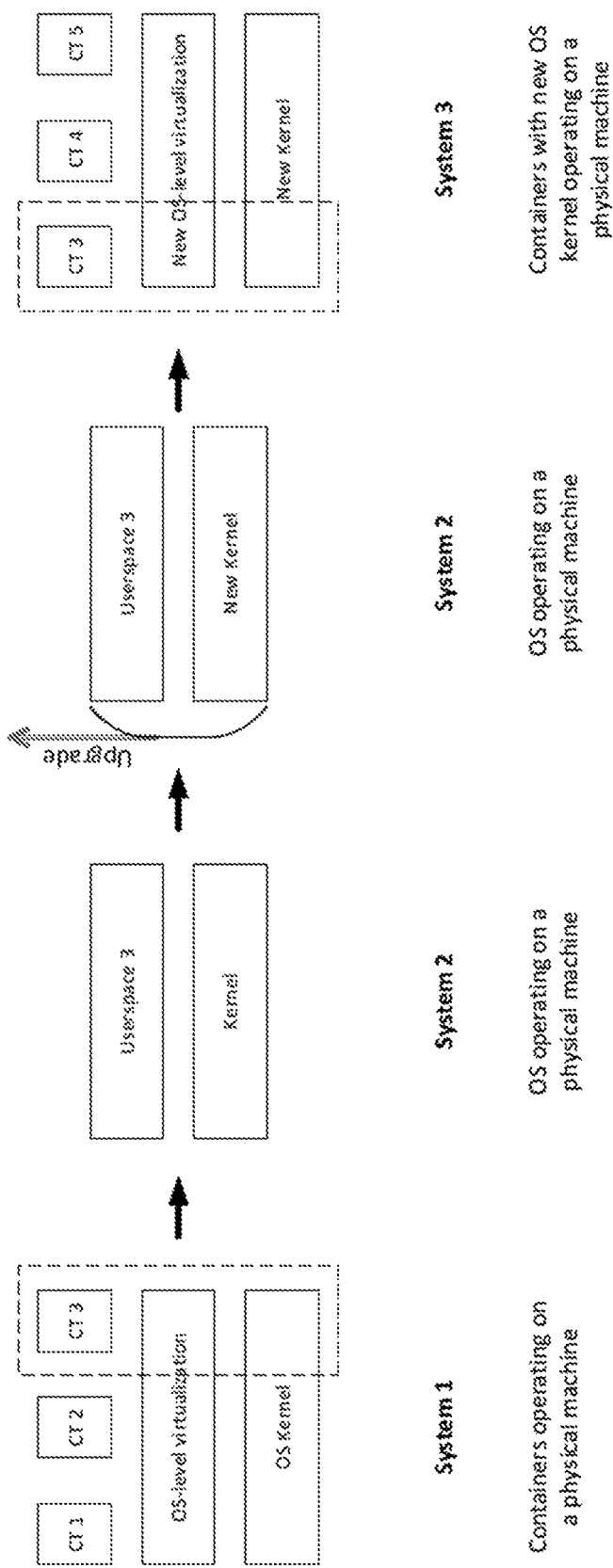
FIG. 6 is a block diagram illustrating another method and system for upgrading a container to another version of an operating system while preserving user applications and data of the container, according to a further exemplary aspect of the disclosure.

FIG. 6 is a block diagram illustrating a further exemplary aspect of the disclosure, similar to the general method and system of FIG. 4 but with additional details provided. In this exemplary aspect, the auxiliary host ("System 2") is a physical machine. As illustrated by the diagram, the conversion and migration of CT3 to System 2 includes destroying operating system level virtualization of CT3 on the first container host. Thereafter, a copy of the operating system kernel from System 1 and the user space from CT3 is transferred to System 2. Once these items have been copied to System 2, the operating system is upgraded. Finally, the upgraded operating system is converted and migrated to the second container host ("System 3"). In this step, the kernel and user space of the upgraded operating system is separated, a new operating system level virtualization is created on System 3, and the disk data containing the kernel and user space of CT3' is transferred to System 3. The net result of this process is a new container on the second container host containing the user space of CT3 and upgraded operating system components compatible with the operating system kernel of the second container host.

Figure 7:
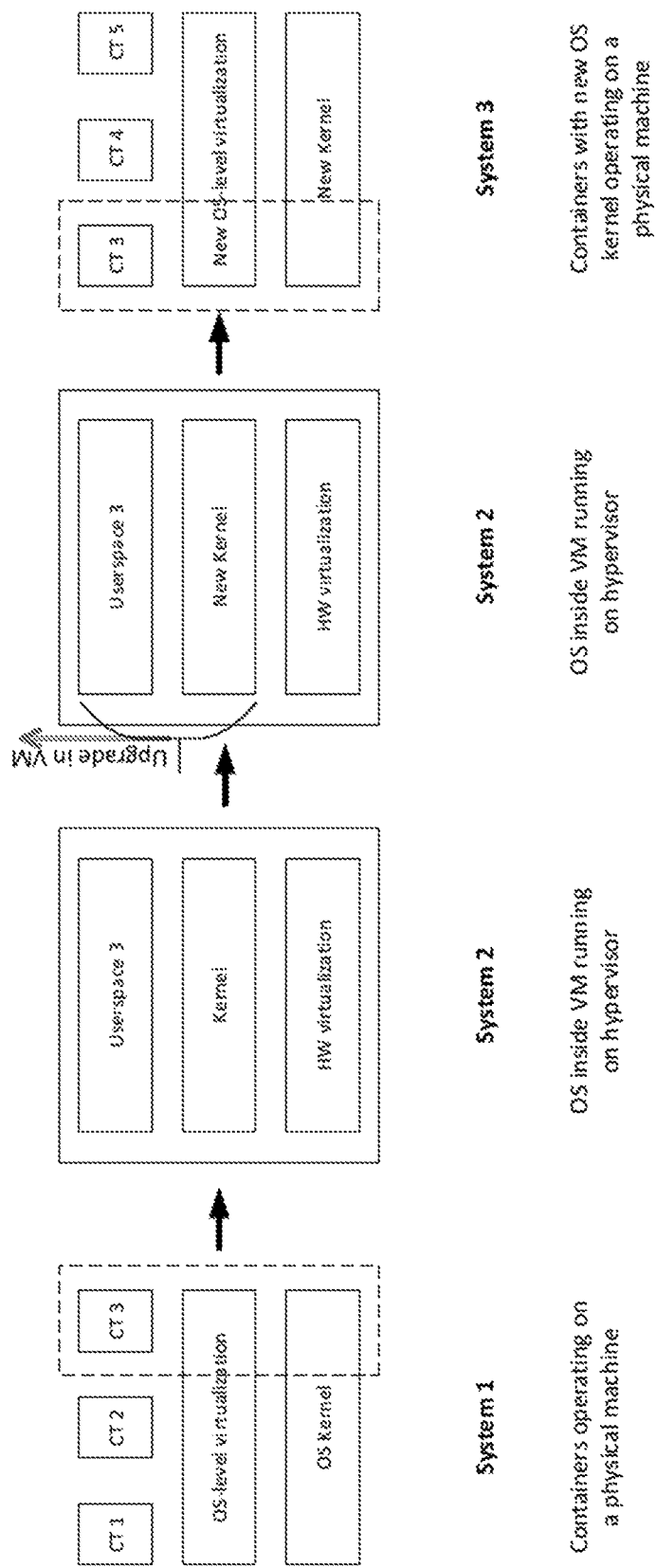
FIG. 7 is a block diagram illustrating another method and system for upgrading a container to another version of an operating system while preserving user applications and data of the container, according to a further exemplary aspect of the disclosure.

FIG. 7 is a block diagram illustrating another exemplary aspect of the disclosure, a method similar to the method of FIG. 5 but with additional details shown. In this exemplary aspect, the auxiliary host ("System 2") is a virtual machine. In this example, the hypervisor provides all of the hardware (either by virtualizing or by passing through) to the guest operating system, and the guest operating system operates as if it was running on a physical server.

Figure 8:
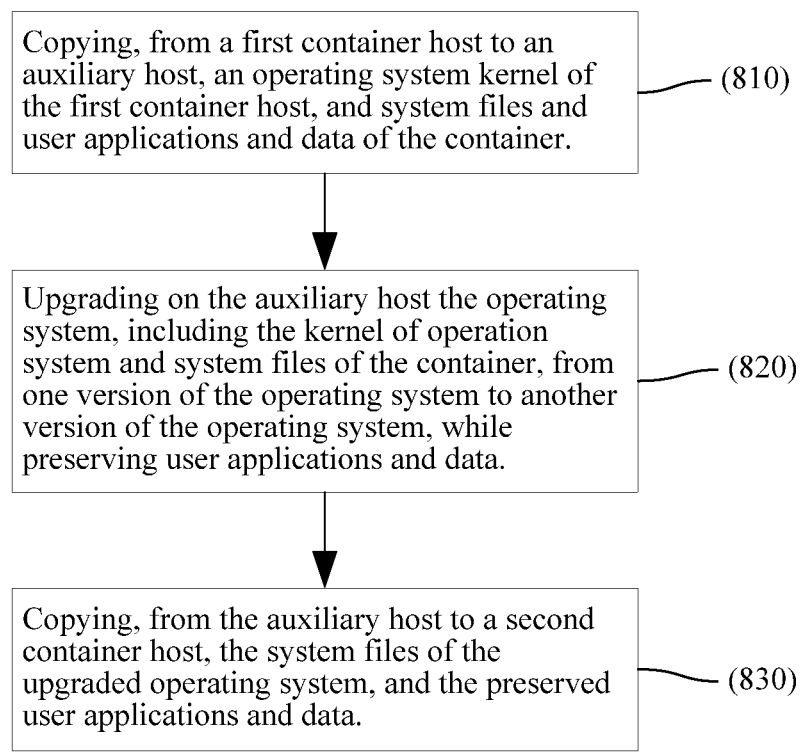
FIG. 8 is a flow chart illustrating a general method for upgrading a container to another version of an operating system while preserving user applications and data of the container, according to a further exemplary aspect of the disclosure.

FIG. 8 is a flowchart diagram illustrating a general method for upgrading a container to another version of an operating system while preserving user applications and data of the container, according to an exemplary aspect of the disclosure. As shown by the flowchart and described elsewhere in this disclosure, any of the hosts involved in the upgrade process can be virtual or physical machines. The upgrade process begins, at step 810, by copying, from a first container host to an auxiliary host, an operating system kernel of the first container host, and system files and user applications and data of the container. The operating system of the selected container may then be upgraded, as it is no longer associated with the kernel of the operating system running on the first container host. Thus, the method proceeds, at step 820, by upgrading, on the auxiliary host, the operating system, including the kernel of operation system and system files of the container, from one version of the operating system to another version of the operating system, while preserving user applications and data. After the upgrade is complete, the process concludes, at step 830, by copying, from the auxiliary host to a second container host, the system files of the upgraded operating system, and the preserved user applications and data. Some or all of these steps can be controlled or performed by a control agent, which may be implemented as standalone software running on a separate machine or any of the hosts involved in the upgrade process or distributed among one or more of these first container host, the second container host and the auxiliary host.

Figure 9:
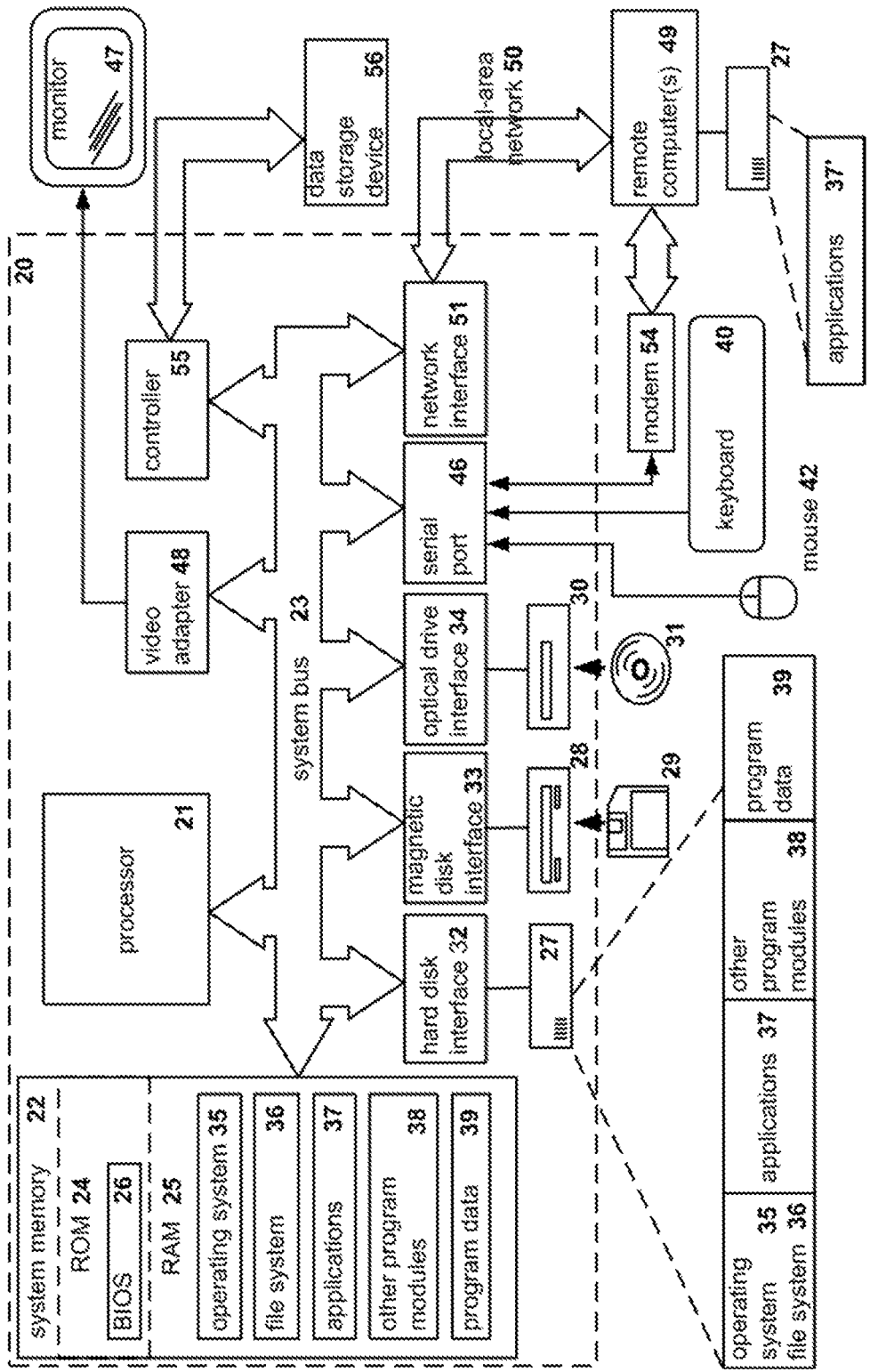
FIG. 9 is a schematic view illustrating an exemplary general-purpose computer system on which the disclosed systems, methods, and software products can be implemented.

FIG. 9 illustrates an example of a general-purpose computer system (which may be a personal computer or a server) on which the disclosed systems and method can be implemented according to an example aspect. It should be appreciated that the detailed general-purpose computer system can correspond to any of the hosts described above (e.g., as shown in FIG. 3 and described in the related passages herein). In aspects featuring a virtual machine as the first or second container host, or the auxiliary host, the virtual machine may emulate any of the hardware components of the computer system. In this case the virtual machine is implemented by hypervisor that is working on such general-purpose computer system.

As shown in FIG. 9, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 9. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein. For example, one of ordinary skill would readily appreciate that individual features from any of the exemplary aspects disclosed herein may be combined to generate additional aspects that are in accordance with the inventive concepts disclosed herein Although the method operations were described in a specific order, it should be understood that other operations may be performed in between the described operations, or operations may be adjusted so that they occur at slightly different times, or may be distributed in a system which allows the occurrence of the processing operations at various intervals associated with the processing, as long as the processing of the overlay operations are performed in the desired way.

Although illustrative exemplary aspects have been shown and described, a wide range of modification, change and substitution is contemplated in the foregoing disclosure and in some instances, some features of the exemplary aspects may be employed without a corresponding use of other features. Accordingly, it is appropriate that the appended claims be construed broadly and in a manner consistent with the scope of the exemplary aspects disclosed herein.

The invention claimed is:

1. A method for upgrading a container to another version of an operating system while preserving user applications and data of the container, the method comprising steps of:
   receiving a user selection of the container to upgrade from a plurality of containers on a first container host;
   in response to receiving the user selection, copying, from the first container host to an auxiliary host, an operating system kernel of the first container host, and initial system files and the user applications and data of the container;
   upgrading, on the auxiliary host, the operating system, wherein the operating system includes the operating system kernel and the system files of the container, from one version of the operating system to another version of the operating system, while preserving the user applications and data;
   copying, from the auxiliary host to a second container host, upgraded system files of the upgraded operating system, and the preserved user applications and data of the container; and
   wherein an operating system kernel of the second container host is compatible with the upgraded system files of the upgraded operating system and incompatible with both the initial system files of the container and system files of the plurality of containers on the first container host.

2. The method of claim 1, wherein at least one of the first container host and the second container host is a physical machine comprising at least one processor.

3. The method of claim 1, wherein along with copying, from the first container host to the auxiliary host, the method further comprises:
   configuring the kernel of the operating system and the initial system files of the container to boot the operating system generated by combining them on the auxiliary host.

4. The method of claim 1, wherein along with copying, from the auxiliary host to the second container host, the method further comprises:
   configuring the upgraded system files of the container to run the container on the second container host.

5. The method of claim 1, wherein upgrading the operating system on the auxiliary host further comprises:
   upgrading, without loss of compatibility to each other, the kernel of the operating system and the initial system files of the container to a newer version of the operating system, while preserving user applications and data.

6. The method of claim 1, wherein upgrading the operating system on the auxiliary host further comprises:
   booting the operating system on the auxiliary host.

7. The method of claim 1, wherein the upgrade is performed using one or more tools provided by an operating system vendor.

8. The method of claim 1, wherein the upgrade is performed in-place on a running operating system.

9. The method of claim 1, wherein the upgrade is performed on the auxiliary host without booting the operating system on the auxiliary host.

10. The method of claim 1, wherein the auxiliary host is a physical machine.

11. The method of claim 1, wherein the auxiliary host is a virtual machine.

12. The method of claim 1, wherein the auxiliary host is selected according to a configuration of resources that the container had on the first container host.

13. The method of claim 11, wherein the virtual machine is created according to a configuration of resources that the container had on the first container host.

14. The method of claim 1, wherein the first and second container hosts provide OS level virtualization and the auxiliary host does not provide OS level virtualization.

15. The method of claim 1, further comprising: providing a control agent configured to control the one or more steps of the method.

16. The method of claim 15, wherein the functionality of the control agent is distributed among one or more of the first container host, the second container host and the auxiliary host.

17. A system for upgrading a container to another version of an operating system while preserving user applications and data of the container, the system comprising:
   at least one processor executing a control agent configured to control:
   receiving a user selection of the container to upgrade from a plurality of containers on a first container host;
   in response to receiving the user selection, copying, from the first container host to an auxiliary host, an operating system kernel of the first container host, and initial system files and the user applications and data of the container;

upgrading, on the auxiliary host, the operating system, wherein the operating system includes the operating system kernel and the system files of the container, from one version of the operating system to another version of the operating system, while preserving the user applications and data;

copying, from the auxiliary host to a second container host, upgraded system files of the upgraded operating system, and the preserved user applications and data of the container; and wherein an operating system kernel of the second container host is compatible with the upgraded system files of the upgraded operating system and incompatible with both the initial system files of the container and system files of the plurality of containers on the first container host.

18. The system of claim 17, wherein at least one of the first container host and the second container host is a physical machine comprising at least one processor; and
wherein each of the first and second container hosts is configured to run at least one container on a shared kernel.

19. The system of claim 17, wherein along with copying, from the first container host to the auxiliary host, the control agent further configured to control:
configuring the kernel of the operating system and the initial system files of the container to boot the operating system generated by combining them on the auxiliary host.

20. The system of claim 17, wherein along with copying, from the auxiliary host to the second container host, the control agent further configured to control:
configuring the upgraded system files of the container to run the container on the second container host.

21. The system of claim 17, wherein the upgrade is performed in-place on running operating system.

22. The system of claim 17, wherein the functionality of the control agent is distributed among one or more of the first container host, the second container host and the auxiliary host.

23. A system for upgrading a container to another version of an operating system while preserving user applications and data of the container, the system comprising:
one or more processors configured to execute:
a first container host comprising a kernel of a first version of the operating system and configured to run at least one container, the container comprising initial system files, user applications and data;
a second container host comprising a kernel of a second version of the operating system;
an auxiliary host communicatively coupled to the first and second container hosts; wherein:
the one or more processors receive a user selection of the container to upgrade from a plurality of containers on the first container host;
in response to receiving the user selection, the kernel of the first version of the operating system, the initial system files, the user applications and data of the container are copied from the first container host to the auxiliary host;
the operating system on the auxiliary host, including the kernel of the first version of the operating system and the system files of the container, is upgraded from the first version of the operating system to the second version of the operating system, while preserving the user applications and data;

upgraded system files of the upgraded operating system, and the preserved user applications and data of the container are copied from the auxiliary host to the second container host; and wherein an operating system kernel of the second container host is compatible with the upgraded system files of the upgraded operating system and incompatible with both the initial system files of the container and system files of the plurality of containers on the first container host.

24. The system of claim 23, wherein at least one of the first container host and the second container host is a physical machine comprising at least one processor; and
wherein each of the first and second container hosts is configured to run at least one container on a shared kernel.

25. The system of claim 23, wherein along with copying, from the first container host to the auxiliary host, further configuring the kernel of the first version of the operating system and the initial system files of the container to boot the operating system generated by combining them on the auxiliary host.

26. The system of claim 23, wherein along with copying, from the auxiliary host to the second container host, further configuring the upgraded system files of the container to run the container on the second container host.

27. The system of claim 23, wherein the upgrade is performed in-place on running operating system.

28. The system of claim 23, further comprising a control agent configured to control:
receiving the user selection of the container to upgrade from the plurality of containers on the first container host;
in response to receiving the user selection, copying, from the first container host to the auxiliary host, the kernel of the first version, and the initial system files, the user applications and data of the container;
upgrading on the auxiliary host the operating system, wherein the operating system includes the kernel of the first version and the system files of the container, from the first version of the operating system to the second version of the operating system, while preserving user applications and data; and
copying, from the auxiliary host to the second container host, the upgraded system files of the upgraded operating system, and the preserved user applications and data; and
wherein the functionality of the control agent is distributed among one or more of the first container host, the second container host and the auxiliary host.

29. A non-transitory computer readable medium storing computer executable instructions for upgrading a container to a newer version of an operating system while preserving user applications and data of the container, including instructions for:
receiving a user selection of the container to upgrade from a plurality of containers on a first container host;
in response to receiving the user selection, copying, from the first container host to an auxiliary host, an operating system kernel of the first container host, and initial system files and the user applications and data of the container;
upgrading, on the auxiliary host, the operating system, wherein the operating system includes the operating system kernel and the system files of the container, from one version of the operating system to another version of the operating system, while preserving the user applications and data;

copying, from the auxiliary host to a second container host, upgraded system files of the upgraded operating system, and the preserved user applications and data of the container; and wherein an operating system kernel of the second container host is compatible with the upgraded system files of the upgraded operating system and incompatible with both the initial system files of the container and system files of the plurality of containers on the first container host.

\* \* \* \* \*